United States Patent [19]
Suzuki et al.

[11] Patent Number: 5,771,030
[45] Date of Patent: Jun. 23, 1998

[54] APPARATUS AND METHOD FOR DRIVING LIQUID CRYSTAL

[75] Inventors: Hidefumi Suzuki, Kawasaki; Akihiro Funakoshi, Kamakura; Isamu Miwa, Fujisawa, all of Japan

[73] Assignee: International Business Machines Corporation, Armonk, N.Y.

[21] Appl. No.: 380,534

[22] Filed: Jan. 30, 1995

[30] Foreign Application Priority Data

Jan. 28, 1994 [JP] Japan .................................. 6-008740

[51] Int. Cl.$^6$ ................................................ H04N 7/00
[52] U.S. Cl. ........................... 345/87; 348/572; 341/159
[58] Field of Search ................................ 345/87, 90, 38, 345/84; 341/155, 158, 159; 348/572

[56] References Cited

U.S. PATENT DOCUMENTS

| | | | |
|---|---|---|---|
| 4,523,232 | 6/1985 | Kameda et al. | 348/572 X |
| 4,642,693 | 2/1987 | Fuse et al. | 348/572 X |
| 4,745,461 | 5/1988 | Shirai et al. | 348/572 X |
| 4,775,891 | 10/1988 | Aoki et al. | 348/572 |
| 4,918,450 | 4/1990 | Sugiyama et al. | 341/159 |
| 5,130,798 | 7/1992 | Christopher . | |
| 5,410,329 | 4/1995 | Tagawa et al. | 345/104 |

FOREIGN PATENT DOCUMENTS 0542307  5/1993  European Pat. Off. ......... G96G 3/36

*Primary Examiner*—Mark R. Powell
*Attorney, Agent, or Firm*—Ronald L. Drumheller

[57] ABSTRACT

To drive a liquid crystal panel without producing flickering or noise on a screen, an adder circuit 26 adds the noise component of the analog signal detected in a filter 24 to a reference voltage from a power supply 16, and a phase adjustment circuit 28 adjusts the phase of the reference voltage to which the noise component was added. A circuit 12 holds the analog signal and outputs it to comparators $14_1$ to $14_n$. The reference voltage from the circuit 28 is divided in resistors $18_1$ to $18_{n+1}$ and output to comparators $14_1$ to $14_n$ as threshold voltages $TV_1$ to $TV_n$. The comparator 14 compares the input analog signal to the voltage TV, and outputs a predetermined signal to an encoder 20 if the analog signal is greater than the voltage TV. The encoder 20 converts the signal from the comparator 14 to a digital signal and applies it to the electrode of a liquid crystal panel.

6 Claims, 3 Drawing Sheets

APPARATUS AND METHOD FOR DRIVING LIQUID CRYSTAL

BACKGROUND OF THE INVENTION

1. Field of the invention

The present invention is related to a method and an apparatus for driving liquid crystal, and, more specifically, to a method and an apparatus for driving liquid crystal in which a liquid crystal panel is driven based on an analog signal representing an image by a voltage.

2. Related Art

If an image display is performed by using a cathode ray tube (CRT), a digital signal corresponding to an image precessed in a computer and the like is converted to analog in an analog signal interface and input to the input terminal for the CRT. The input analog signal is a time series signal (voltage waveform) for each pixel on the CRT. Based on the analog signal, three electron beams excite the corresponding red, blue, and green fluorescent materials applied on the faceplate of the CRT to emit light. As a result, the red, blue, and green fluorescent materials in a pixel on the screen of the CRT emit light.

If it is desired that an image be displayed at a place other than the location at which the CRT is installed, the image display may be performed by a liquid crystal display device (LCD) which is convenient to carry. In this case, the analog signal (voltage waveform) converted to analog in the analog signal interface of a computer is converted to a digital signal, which is input to the LCD.

In the method for driving an LCD by converting an analog signal representing an image by a voltage to a digital signal as described above, an analog-to-digital (A/D) converter 10 is used, as shown in FIG. 4. That is, an analog signal (R, G, B) which is the input signal to the CRT is sampled with a sampling clock signal input at predetermined times of the analog signal in each pixel, and the resultant sampled values (voltage values) are output to comparators $14_1, 14_2, \ldots 14_n$. Further, the voltage supplied from a stabilized DC power supply 16 is divided by resistors $18_1, 18_2, \ldots 18_{n+1}$ to produce the predetermined reference voltages (threshold voltages) $TV_1, TV_2, \ldots TV_n$ for the comparators $14_1, 14_2, \ldots 14^n$. Each comparator $14_1, 14_2, \ldots 14_n$ compares a sampled value of the input analog signal with the threshold voltage $TV_1, TV_2, \ldots TV_n$ and outputs a predetermined signal to an encoder 20 when the sample value is greater than the threshold voltage TV. The encoder 20 then, converts the signal from the comparator 14 to a digital signal for the LCD and applies it to a corresponding electrode of the liquid crystal panel. In this way, a voltage corresponding to the signal is by the comparator 14 to the electrode.

With this method, however, if there is noise in the input analog signal, the following problem occurs: That is, the analog signal including noise is a voltage waveform as shown in FIG. 5. If such an analog signal is sampled based on a sampling clock signal SC, a value greater or smaller than the voltage value of the original analog signal would be sampled. Thus, for instance, in the comparator 14, the voltage value of the original analog signal which should be detected as smaller than the threshold voltage TV with which it is compared, may be erroneously detected as greater than the threshold voltage TV because of more noise. As a consequence, the encoder 20 converts the analog signal including the noise component to digital, and a digital signal including the noise component is applied to the corresponding electrode of the liquid crystal panel. As a result, in one screen formed by a plurality of scans, different voltages are applied to the electrode of each pixel of the liquid crystal panel, thus producing flickering or noise on the screen.

SUMMARY OF THE INVENTION

The present invention was accomplished in view of the above described fact, and its object is to provide a method and an apparatus for driving liquid crystal which drives a liquid crystal panel without causing flickering or noise on the screen.

To accomplish the this object, the invention generates a reference voltage based on the noise component of an analog signal representing an image by a voltage waveform, compares the reference voltage to the analog signal to convert the analog signal to a digital signal, and applies the converted digital signal to the corresponding electrode of a liquid crystal panel to drive the liquid crystal panel.

In accordance with one aspect of the invention the phase of the reference voltage is adjusted.

The invention comprises a reference voltage output means for outputting a predetermined reference voltage, a detection means for detecting the noise component of an analog signal representing an image by a voltage waveform, an adder means for adding the detected noise component to the reference voltage, and an application means for comparing the reference voltage to which the noise component was added with the input analog signal to convert the analog signal to a digital signal, and applying the digital signal to the corresponding electrode of a liquid crystal panel.

The invention is also provided with an adjustment means for adjusting the phase of the reference voltage to which the noise component was added.

In accordance with the invention, a reference voltage is generated based on the noise component of an analog signal representing an image by a voltage waveform, the reference voltage and the analog signal are compared to convert the analog signal to a digital signal, and the converted digital signal is applied to the corresponding electrode of a liquid crystal panel to drive the liquid crystal panel.

Thus, since the invention generates a reference voltage based on the noise component of an analog signal and compares the reference voltage to the analog signal to convert the analog signal to a digital signal, the converted digital signal includes no noise even if the analog signal includes noise, whereby a liquid crystal panel can be driven based on the noise-free digital signal, and the occurrence of flickering or noise can be prevented on a screen of the liquid crystal panel in which one screen is formed by a plurality of scans.

If the removal of the noise component of the analog signal is attempted by inverting the analog signal representing an image by a voltage waveform and adding the noise component to the inverted analog signal, a distortion may occur in the waveform of the analog signal or new noise may occur. However, if the reference voltage is generated based on the noise component of the analog signal, such a thing will not occur. In addition, for instance, if one analog signal is input to a plurality of display devices such an LCD and a CRT, it is also not desirable that the noise component be added to the inverted analog signal to remove the noise component from the analog signal.

In one embodiment, the phase of the reference voltage is adjusted. Since the phase of the reference voltage is adjusted, even if the phase of the reference voltage does not correspond to that of the analog signal, the phase of the reference voltage can be made to correspond to that of the analog signal.

In the invention as set forth in another embodiment, the reference voltage output means outputs a predetermined reference voltage. The detection means detects the noise component of the analog signal representing an image by a voltage waveform. The adder means adds the detected noise component to the reference voltage. The application means compares the reference voltage, to which the noise component was added, to the input analog signal to convert the analog signal to a digital signal, and applies the digital signal to the corresponding electrode of a liquid panel.

In this embodiment, the reference voltage to which the noise component of the analog signal was added is compared to the analog signal to convert the analog signal to a digital signal, so that the noise component of the analog signal is not contained in the converted digital signal. Consequently, a noise-free digital signal is applied to the corresponding electrode of a liquid crystal. As a result, the same voltage is always applied to the liquid crystal in which one screen is formed by a plurality of scans, whereby flickering or noise can be prevented on the screen.

In this embodiment, the adjustment means may further adjust the phase of the reference voltage to which the noise component was added. In such case, even if the reference voltage to which the noise component was added is not in phase with the analog signal, the phase of the reference voltage is adjusted so that the phase of the reference voltage to which the noise component was added can be made to be in phase with the analog signal.

DESCRIPTION OF THE PREFERRED EMBODIMENTS

Figure 1:
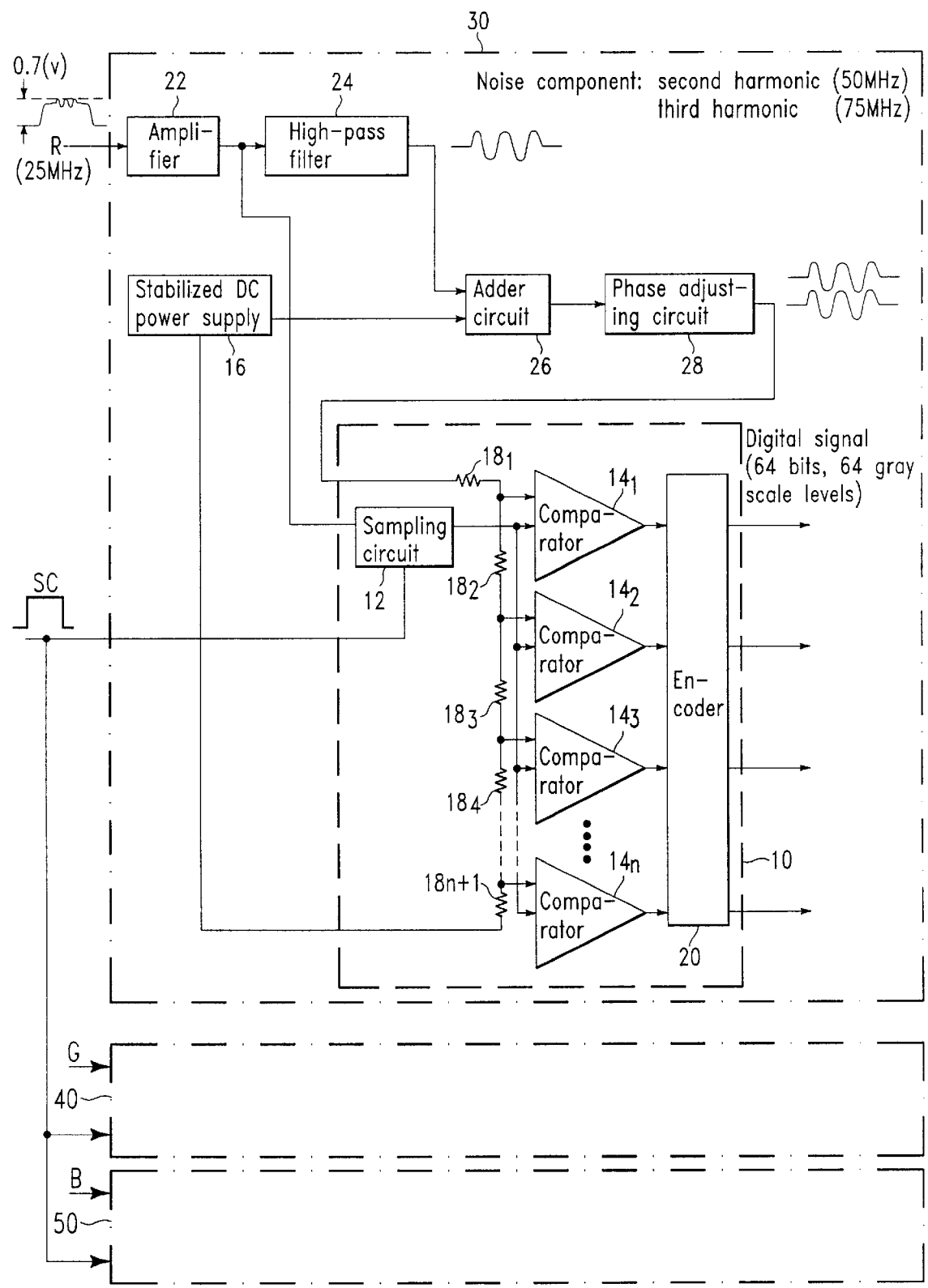
FIG. 1 is a diagram schematically showing the electrical circuit of the apparatus for driving liquid crystal of the embodiment.

The first embodiment of the present invention is described below in detail with reference to the accompanying drawings. A block diagram of the apparatus for driving liquid crystal of this embodiment is shown in FIG. 1. As shown in FIG. 1, the apparatuses are provided for driving liquid crystal 30, 40, and 50 which convert the respective analog signals (R, G, B) output from an analog signal interface (not shown) to digital signals for a liquid crystal display device (TT/LCD) and apply the digital signals to the corresponding electrode of a liquid crystal panel. Since the apparatuses for driving liquid crystal 30, 40, and 50 have the same construction, the following description is directed to the apparatus for driving liquid crystal 30 for the analog signal (R), and the description is omitted of the apparatuses for driving liquid crystal 40 and 50 for the analog signals (G, B).

As shown in FIG. 1, the apparatus for driving liquid crystal 30 comprises an amplifier 22 including a low-pass filter, which amplifies the analog signal (R) output from the analog signal interface. Connected to the amplifier 22 is a high-pass filter 24 as a detection means for detecting the noise component of the discrete voltages of the analog signal. Further, the apparatus for driving liquid crystal 30 comprises a stabilized DC power supply 16 as a reference voltage output means. The stabilized DC power supply 16 and the high-pass filter 24 are connected to an adder circuit 26 as an adder means for adding the noise component detected in the high-pass filter 24 to the reference voltage output by the stabilized DC power supply 16. The adder circuit 26 is connected to a phase adjustment circuit 28 as an adjustment means for adjusting the phase of the reference voltage to which the noise component was added, based on the phase of the analog signal. In addition, the low-pass filter 22 and the phase adjustment circuit 28 are connected to an A/D converter 10 as an application means for converting the analog signal to a 6-bit digital signal and applying it to the corresponding electrode of a liquid crystal panel.

The A/D converter 10 includes a sample circuit 12, which holds the discrete voltages of the analog signal amplified in the amplifier 22 when a clock signal is input, and this clock signal is output by a clock signal output means (not shown) at a predetermined time for each pixel. The sample circuit 12 is connected to 63 comparators $14_1$ to $14_n$ (n=63). The A/D converter 10 further includes resisters $18_1, 18_2, \ldots 18_{n+1}$ for dividing the reference voltage, the phase of which was adjusted in the phase adjustment circuit 28, to produce threshold voltages $TV_1, TV_2, \ldots TV_n$ for the comparators $14_1, 14_2, \ldots 14_n$. In addition, the comparators $14_1, 14_2, \ldots 14_n$ are connected to an encoder 20. The encoder 20 is connected to the corresponding electrode of a liquid crystal panel (not shown).

Figure 2:
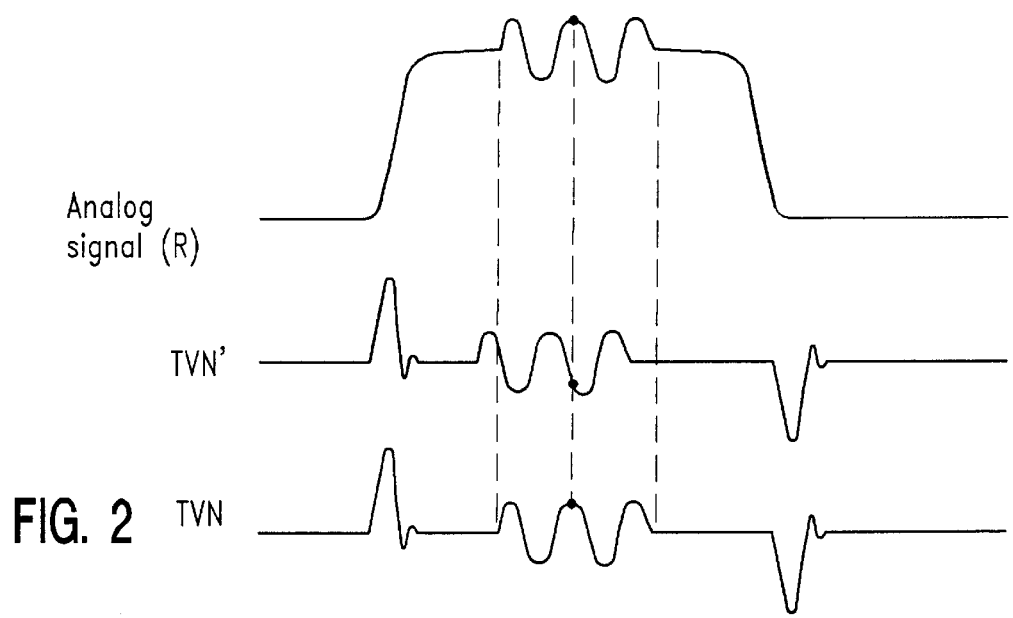
FIG. 2 is a diagram showing relationship between an analog signal having noise and a threshold to which the noise has been added.
Figure 3:
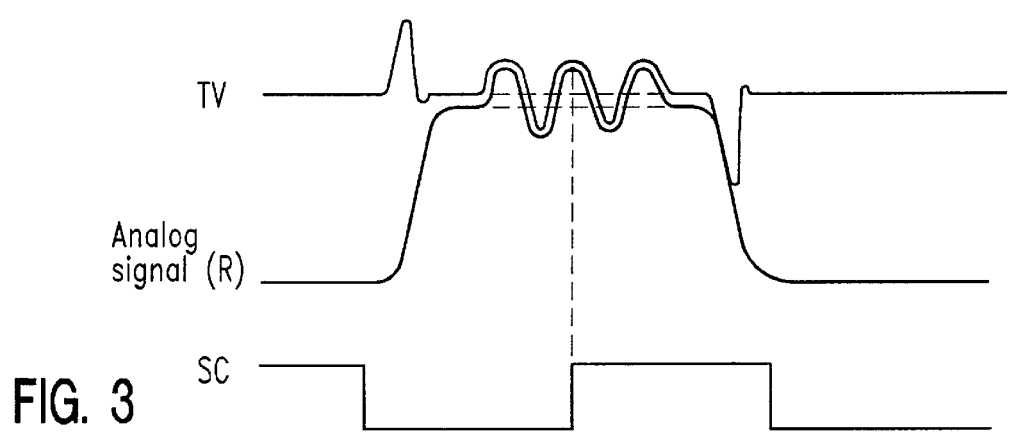
FIG. 3 is a diagram showing relationship between the phase of an analog signal and a phase of a threshold voltage.
Figure 5:
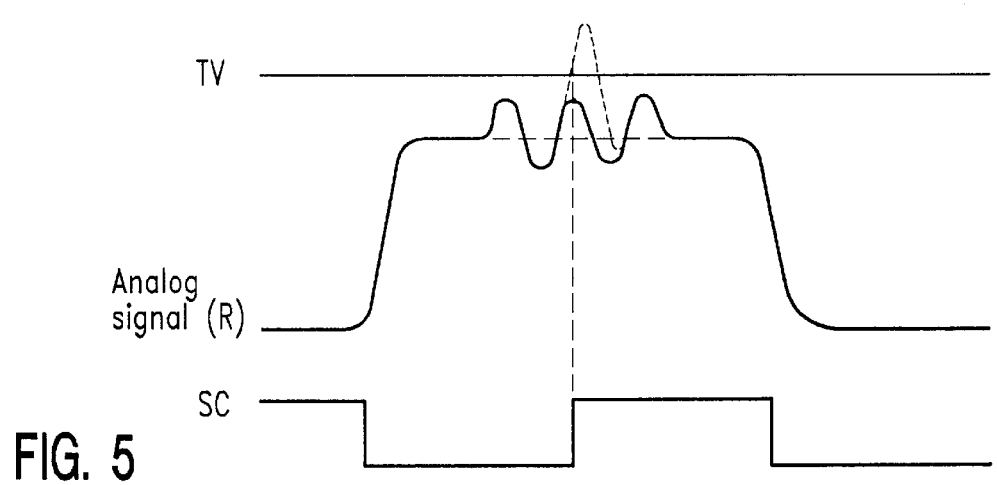
FIG. 5 is a diagram showing relationship between an analog signal having noise and a threshold voltage in the prior art.
Figure 4:
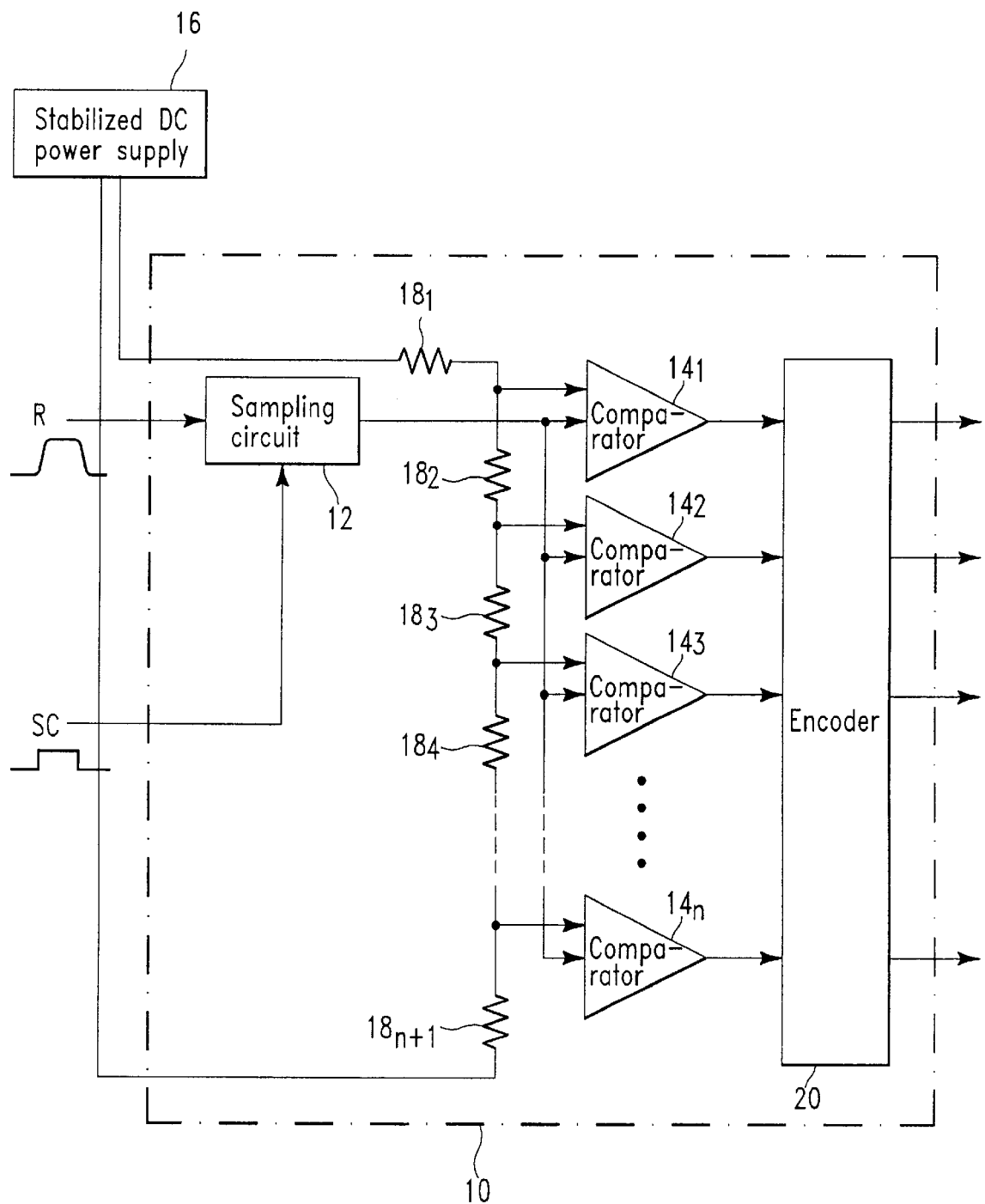
FIG. 4 is a diagram schematically showing the electrical circuit of the prior art A/D converter for converting an analog signal to a digital signal.

The operation of the apparatus for driving liquid crystal 30 of this embodiment is described below with reference to FIGS. 1 to 3. In this case also, only the operation for processing the analog signal (R) is explained.

The analog signal ((R), 25 MHz, 0.7 V) output by the analog signal interface (not shown) is amplified to double in the amplifier 22 to be stripped of its low-frequency components to the extent that its original shape is maintained and input to the high-pass filter 24 and the sample circuit 12. The high-pass filter 24 detects the noise component of the analog signal. That is, the high-pass filter 24 detects the second harmonic component (50 MHz) and the third harmonic component (75 MHz), of the analog signal existing in the range of 20 to 40 MHz, and outputs the detected noise component to the adder circuit 26. The adder circuit 26 adds the noise component input from the high-pass filter 24 to the reference voltage output by the stabilized DC power supply 16, and outputs the results to the phase adjustment circuit 28. In the phase adjustment circuit 28, the phase of the reference voltage to which the noise component was added is adjusted. In this case, for instance if the noise component existing in the analog signal is simply added to the threshold voltage, the threshold voltage may not be in phase with the discrete voltages of the analog signal as shown in FIG. 2 by the threshold voltage TV'. Thus, by using the phase adjustment circuit 28, the reference voltage to which the noise was added is adjusted based on the discrete voltages of the analog signal.

The sample circuit 12 holds the analog signal amplified in the amplifier 22 when a clock signal is input to the sample circuit 12, and outputs the held voltage value to the comparators $14_1$ to $14_n$. In addition, the reference voltage the phase of which was adjusted in the phase adjustment circuit 28 is divided by the resistors $18_1$ to $18_{n+1}$ into the threshold voltages $TV_1$ to $TV_n$, which are output to the comparators $14_1$ to $14_n$.

The comparators $14_1$ to $14_n$ compare the input analog signal to the threshold voltages $TV_1$ to $TV_n$, and output a predetermined signal to the encoder 20 if the analog signal is greater than the threshold voltage TV. The encoder 20 converts the signal from the comparators $14_1$ to $14_n$ to a 6-bit digital signal for a liquid crystal display device, and outputs the digital signal to a corresponding electrode of a liquid crystal panel. In this embodiment, 63 comparators 14 are used to detect the analog signal in 64 levels. Thus, the converted digital signal is in 64 gray scale levels (20 mV for each gray scale level), and the voltage corresponding to the number of gray scale levels or color of an image is applied to the electrode.

In accordance with this embodiment as described above, as shown in FIG. 3, if there is noise in the analog signal, a sampled value greater or smaller than the original analog signal is detected. However, since the noise component existing in the analog signal is added to the threshold voltage TV of the comparator, even a sampled value detected as greater than the original analog signal because of the noise is detected to be smaller than the threshold voltage TV. Thus, the converted digital signal corresponds to the original analog signal, and the same voltage is always applied to a predetermined electrode of a liquid crystal panel in which one screen is formed by a plurality of scans, thereby eliminating the occurrence of flickering or noise on the screen.

Although as TFT/LCD is used as the liquid crystal panel in this embodiment as described above, this is not restrictive and any of the TFT, MIM, STN, and the like can be used.

In addition, in this embodiment, an A/D converter is used for converting the analog signal to a 6-bit digital signal, but this is not restrictive and an A/D converter may be used for conversion to a digital signal of 3 bits, 4 bits, or even 6 bits.

Furthermore, the numeric values in this embodiment are provided only by way of example and are not restrictive.

As described above, since the invention generates a reference voltage based on the noise component of an analog signal and compares the reference voltage to the analog signal to convert the analog signal to a digital signal, the converted digital signal contains no noise even if the analog signal contains noise, thus enabling a liquid crystal panel to be driven based on a noise-free digital signal, and it thus has an advantage in that the occurrence of flickering or noise can be prevented on the screen of the liquid crystal panel in which one screen is formed by a plurality of scans.

Since the invention in one embodiment adjusts the phase of the reference voltage, even if the reference voltage is not in phase with the analog signal it has an advantage in that the reference voltage can be made to be in phase with the analog signal.

Since the invention in another embodiment compares the reference voltage to which the noise component of the analog signal representing an image by a voltage waveform to the analog signal to convert the analog signal to a digital signal, the noise component of the analog signal is not contained in the converted digital signal and hence a noise-free digital signal is applied to the corresponding electrode of a liquid crystal panel, by which the same voltage is always applied to the crystal panel formed by a plurality of scans, and it thus has an advantage in that the occurrence of flickering or noise on the screen can be prevented.

Since the invention in one embodiment adjusts the phase of the reference voltage, even if the reference voltage to which the noise components was added is not in phase with the analog signal it has an advantage in that the reference voltage to which the noise component was added can be made to be in phase with the analog signal.

We claim:

1. A method for driving liquid crystal comprising the steps of:

extracting a noise component from an input analog signal representing an image by a voltage waveform, generating a constant voltage, adding said extracted noise component to said constant voltage to produce a threshold reference voltage, applying said threshold reference voltage and said input analog signal to an analog-to-digital converter to convert said analog signal to a digital signal, and applying said digital signal to the corresponding electrode of a liquid crystal panel to drive said liquid crystal panel.

2. A method for driving liquid crystal as set forth in claim 1 wherein the phase of said reference voltage is adjusted.

3. An apparatus for driving liquid crystal comprising:

means for outputting a predetermined constant voltage, means for detecting the noise component of an input analog signal representing an image by a voltage waveform, an adder for adding said detected noise component to said constant voltage to produce a threshold reference voltage, an analog-to-digital converter for receiving said threshold reference voltage and said input analog signal and converting said analog signal to a digital signal, and a liquid crystal panel for receiving said digital signal and displaying said image.

4. An apparatus for driving liquid crystal as set forth in claim 3 further comprising an adjustment means for adjusting the phase of said threshold reference voltage.

5. A method for driving liquid crystal as set forth in claim 1 wherein said noise component is extracted from said analog signal with a high-pass filter.

6. Apparatus for driving liquid crystal as set forth in claim 3 wherein said detecting means comprises a high-pass filter.

* * * * *